F. W. WILLIG.
DETACHABLE EXTENSION RIM FOR TRACTOR WHEELS.
APPLICATION FILED DEC. 22, 1921.

1,414,537. Patented May 2, 1922.

WITNESSES

Inventor
F. W. Willig
ATTORNEY

UNITED STATES PATENT OFFICE.

FRED W. WILLIG, OF GERVAIS, OREGON.

DETACHABLE EXTENSION RIM FOR TRACTOR WHEELS.

1,414,537. Specification of Letters Patent. Patented May 2, 1922.

Application filed December 22, 1921. Serial No. 524,171.

*To all whom it may concern:*

Be it known that I, FRED W. WILLIG, a citizen of the United States, residing at Gervais, in the county of Marion and State of Oregon, have invented certain new and useful Improvements in Detachable Extension Rims for Tractor Wheels; and I do declare the following to be a full, clear, and exact description of the invention, such as will enable others skilled in the art to which it appertains to make and use the same.

This invention relates to an auxiliary rim device to be used in connection with a conventional structure of tractor wheel and one object of the invention is to provide an attachment which can be readily put in place and which will be so constructed that it may be provided with cleats which will be mounted between side rings of the attachment and will serve not only as means for connecting the side rings of the attachment but further serve as extensions for the usual cleats which extend transversely of a tractor wheel.

Another object of the invention is to so construct this attachment that the inner ring of the device may be secured to an inwardly extending flange of the tractor wheel and spokes which are connected with the outer ring of the attachment secured to the hub of the tractor wheel by means of bolts which pass through a hub disk and the inner ends of the spokes and into the hub of the tractor.

Another object of the invention is to so construct this attachment that it may be formed of heavy sheet metal thus permitting it to be cheaply produced and at the same time permit of it being so constructed that it will be strong and durable.

Another object of the invention is to so construct this attachment that it will not tend to press down upon the earth and form strips of relatively hard soil across a field.

Another object of the invention is to so construct this attachment that the cross cleats may extend at an angle to the cleats which extend across the tractor wheel and thus permit of a very firm engagement with the ground.

This invention is illustrated in the accompanying drawings, wherein.

Figure 2:
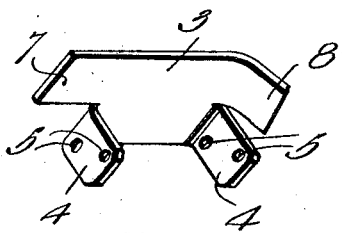
Figure 2 is a perspective view of one of the cleats which form part of the attachment.
Figure 1:
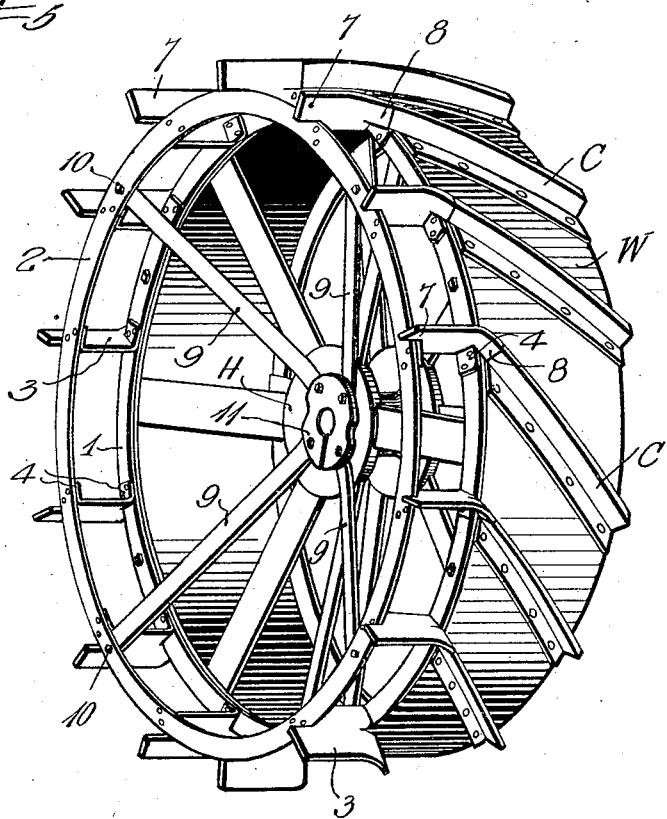
Figure 1 is a perspective view showing the attachment applied to a tractor wheel of a conventional construction.

This device is for use in connection with a conventional structure of tractor wheel and in the present illustration has been shown applied to a tractor wheel W having a hub H, spokes which extend from the hub to the rim of the wheel, and transversely extending cleats C which extend diagonally across the rim of the wheel and are formed of angle iron as shown clearly in Fig. 1. This rim is provided with inwardly extending flanges so that the attachment can be readily connected with the wheel as will be hereinafter brought out.

The attachment is provided with inner and outer rings 1 and 2 which are positioned in spaced relation and held in the desired spaced relation by cleats 3. These cleats are formed of heavy sheet metal, each of which is formed from a rectangular piece of metal cut and bent to provide side arms 4 which engage the rings 1 and 2 and are provided with openings 5 so that rivets or other suitable fasteners may be passed through the rings and side arms to securely hold the cleats between the rings. The end portions of the outer portion of each cleat extend beyond the side arms 4 and provide tongue extensions 7 and 8. The tongue extensions which extend beyond the ring 2 extend in the same plane with the body portions of the cleats but the tongue extensions 8 are bent as shown so that these tongues will meet the ends of the cleats or strips C which extend across the rim of the tractor wheel. It will thus be seen that when the auxiliary rim is put in place and secured by fastener bolts which will pass through the inner ring 1 and inwardly extending flange of the wheel against which this ring fits, the cleats of the attachment will form continuations of the cleats of the main tractor wheel but will extend at substantially right angles to the cleats of the tractor wheel and thus permit of a very firm grip being obtained upon the ground. In order to brace the outer ring and thus strengthen the attachment and further permit of the attachment being more securely connected with the tractor wheel, there has been provided spokes 9 which are secured to the outer ring by bolts or other suitable fasteners 10 and have their inner end portions extending beneath a hub disk 11 so that securing bolts 12 may be passed through the disk 11 and through the inner end portions of the spokes 9 and into the hub of the tractor wheel. It will thus be seen that this attachment will be very firmly anchored to the hub and rim portions of the main tractor wheel when in place and will provide an extension for the main tractor wheel which will be very rigid but at the same time permitting of easy removal when desired.

I claim:

1. A wheel attachment for widening the rim of a tractor wheel, said attachment including a ring for fitting against the side of a tractor wheel rim and a ring in spaced relation to the first mentioned ring, and cleat plates secured between the side rings and holding the rings in spaced relation and each having an outer end portion extending in crossed relation to the rings for co-operating with cleats carried by the rim of a tractor wheel.

2. A wheel attachment for widening the rim of a tractor wheel, said attachment including a ring for fitting against the side of a tractor wheel rim and a ring in spaced relation to the first mentioned ring, and cleat plates carried by said rings and each having an inner end portion extending between the rings and secured to the rings and serving to hold the rings in spaced relation, the outer end portions of the cleat plates extending in crossed relation to the side rings and at one side extended for end to end contact with the cleat plates of a tractor wheel rim.

3. A wheel attachment for widening the rim of a tractor wheel, said attachment including a ring for fitting against the side of a tractor wheel rim and a ring in spaced relation to the first mentioned ring, and cleat plates carried by said rings and each having an inner end portion extending between the rings and provided with side arms secured against the sides of said rings and an outer end portion extending in crossed relation to the rings with the portion extending in crossed relation to the inner ring bent for end to end contact with cleat plates extending diagonally across a tractor wheel rim.

4. A wheel attachment comprising spaced side rings, cleats secured to and extending between the side rings in spaced relation and having outer end portions extending beyond the rings, a hub plate, spokes connected with one of said rings, and fasteners passing through the hub plate and spokes for securing the spokes and hub plate against the hub of a tractor wheel having the attachment positioned to one side thereof.

5. A wheel attachment comprising spaced side rings, cleats between the side rings secured against the inner side faces thereof and extending outwardly beyond the rings and having their outer end portions extending in overlapped relation to the side rings and at one side bent to extend for end to end contact with cleat strips extending diagonally across the rim of a tractor wheel, spokes connected with the outer side ring, and a hub-engaging disk connected with the inner ends of said spokes.

In testimony whereof I have hereunto set my hand.

FRED W. WILLIG.